Sept. 30, 1958 R. B. IMMEL ET AL 2,854,591
SWITCHING SYSTEMS
Filed Aug. 24, 1956 2 Sheets-Sheet 1
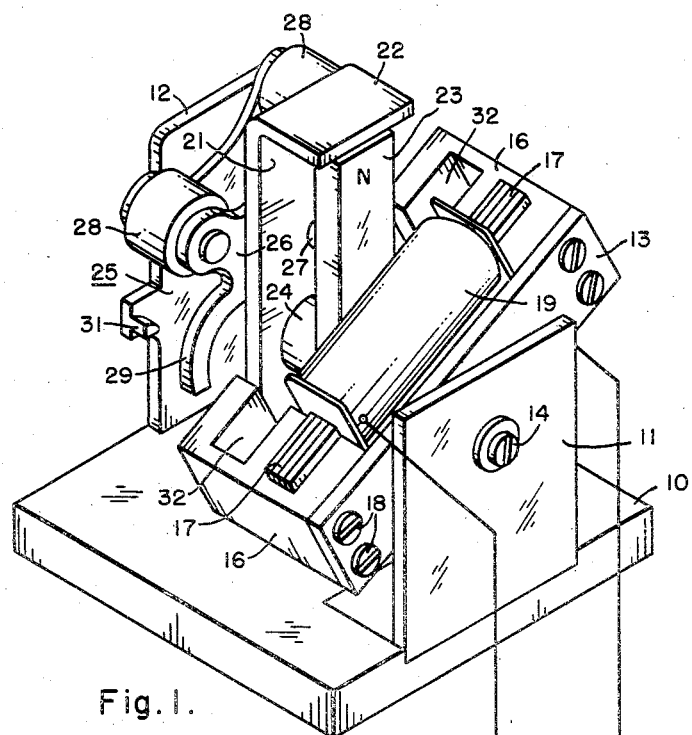
Fig. 1.
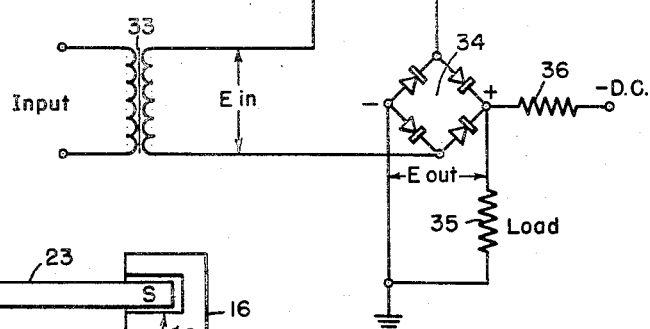
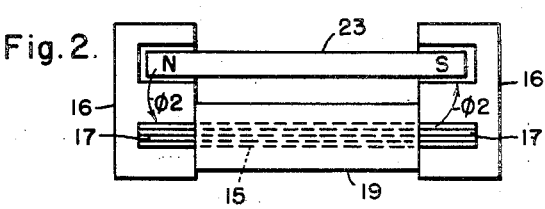
Fig. 2.
Fig. 3.
INVENTORS
Ralph B. Immel &
Marshall P. White.
BY
ATTORNEY United States Patent Office 2,854,591
Patented Sept. 30, 1958

2,854,591

SWITCHING SYSTEMS

Ralph B. Immel, Williamsville, and Marshall P. White, Cheektowaga, N. Y., assignors to Westinghouse Electric Corporation, East Pittsburgh, Pa., a corporation of Pennsylvania Application August 24, 1956, Serial No. 606,169

18 Claims. (Cl. 307—96)

Our invention relates generally to switching systems and, more particularly, to systems in which saturable reactors are utilized for switching purposes.

One object of our invention is to provide a switching system utilizing a contactless switch of the saturable reactor type.

An another object of our invention is to provide a quick-acting switch of the saturable reactor type suitable for utilization in control systems having magnetic logic elements.

Still another object of our invention is to provide a contactless switch suitable for utilization as a limit switch.

A further object of our invention is to provide a switch structure in which a movable member of the switch does not actually engage fixed members of the switch during switching operations.

Still another object of our invention is to provide quick-acting switches having either rotary or linear motion switching members.

A still further object of our invention is to provide a contactless limit switch which may be actuated in opposite directions.

A more general object of our invention is to provide a contactless switch which shall be simple and efficient in operation and which may be economically manufactured and installed.

Other objects of our invention will be explained fully hereinafter or will be apparent to those skilled in the art.

In accordance with one embodiment of our invention, the secondary winding of a transformer is connected across the A. C. terminals of a full-wave rectifier in series with the coils of a saturable reactor. A load circuit is connected across the D. C. terminals of the rectifier. A by-pass circuit is provided for the reactor exciting current so that the exciting current does not flow through the load. The saturation of the reactor is varied by a permanent magnet which is actuated by a quick-acting limit-switch mechanism. When the magnet is in one position the core of the reactor is unsaturated and most of the applied voltage is absorbed by the reactor. When the magnet is actuated to another position the core is saturated and most of the applied voltage appears at the load circuit as full-wave D. C.

For a better understanding of the nature and objects of the invention, reference may be had to the following detailed description, taken in conjunction with the accompanying drawings, in which:

Figure 1 is a view, in perspective, of a switching system embodying the principal features of the invention;

Fig. 2 is a detailed view showing the permanent magnet in position to saturate the core of the reactor;

Fig. 3 is a diagrammatic view showing the distribution of flux in the core of the reactor;

Figure 4:
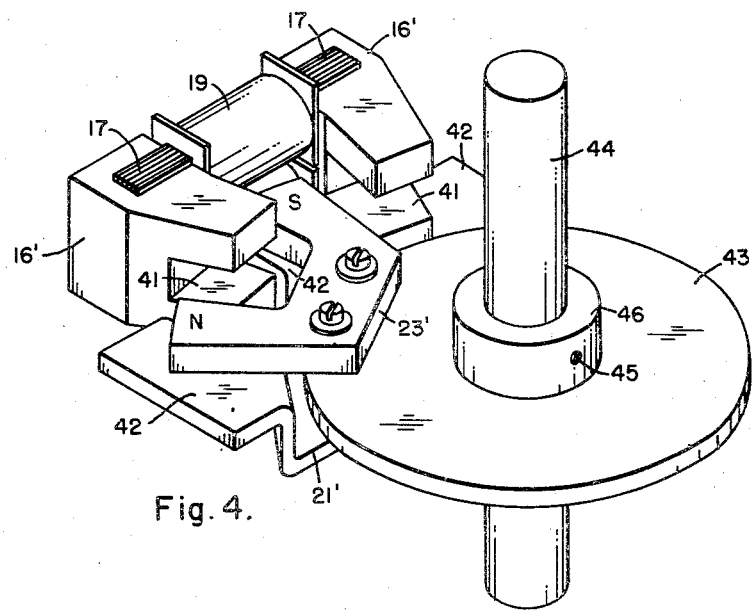
Fig. 4 is a view, in perspective, of a modified form of the switching device shown in Fig. 1.

Referring to the drawings, and particularly to Fig. 1, the switch structure shown therein comprises a base 10 having end brackets 11 and 12 attached thereto. A reactor mounting plate 13, which is composed of non-magnetic material, is adjustably attached to the end bracket 11 by means of a bolt 14. A reactor core 15, which may be composed of U-shaped laminations assembled to form a hollow rectangle as shown in Figs. 2 and 3, is held in place between two pole pieces 16 by end portions 17 of the core. The pole pieces 16 are attached to the mounting plate 13 by screws 18. A coil 19 is disposed on each leg of the core 15. A magnetic keeper 21 having end portions 22 bent at a right angle to the body of the keeper is mounted on the base 10.

A permanent magnet 23 is secured to a shaft 24 which is rotated by a quick-acting mechanism 25. The mechanism 25 may be of a type previously used for operating limit switches and is well known in the prior art, as for example, in Halfvarson Patent No. 1,930,047 issued October 10, 1933. Briefly, the mechanism comprises a lever 26 which is pivotally mounted on a pin 27 secured in the keeper 21. Two rollers 28 are mounted on the lever 26. The rollers 28 may be alternatively engaged by an arm or other means carried by a machine tool or other apparatus, the operation of which is controlled by the limit switch.

When one of the rollers 28 is engaged, an overcenter spring toggle mechanism (not shown) rotates the magnet 23 to the position shown in the drawing. When the other roller 28 is engaged the quick-acting spring mechanism rotates the magnet 23 to a position between the pole pieces 16 and parallel with the reactor core. An arm 29 on the lever 26 engages a stop 31 on the end bracket 12 to limit the movement of the mechanism in the one direction. A similar arm (not shown) engages another stop to limit the movement in the other direction.

The reactor mounting plate 13 may be adjusted in position by being rotated on the reactor mounting bracket 11 and locked in any desired position. As shown, the reactor, comprising the core 15, the coils 19 and the pole pieces 16, is mounted at an angle of 60° from the vertical or 30° from the horizontal position. The keeper 21 is mounted vertically and, as previously explained, the magnet 23 may be actuated from the vertical position between the ends 22 of the keeper to a position parallel to the reactor core. When the magnet 23 is parallel to the reactor core it is disposed in grooves 32 provided in the pole pieces 16.

The two coils 19 are connected in series-circuit relation. As shown in Fig. 1, the coils 19 are connected in series with the secondary winding of a transformer 33, which winding is connected across the alternating current terminals of a full-wave rectifier 34. The primary winding of the transformer 33 may be connected to any suitable source of alternating current. A load circuit, which is represented by a resistor 35, is connected across the direct current terminals of the rectifier 34. A resistor 36, one terminal of which is connected to negative of a separate source of direct current, provides a path for the reactor exciting current, thereby preventing the exciting current from flowing through the load circuit. The positive connection of the separate source may be made at ground to which the negative terminal of the rectifier 34 is also connected.

When the core 15 of the reactor is unsaturated the inductance and hence the impedance are very high, and most of the applied voltage is dropped across the reactor. When the core 15 is saturated only a small part of the applied voltage is absorbed by the reactor and most of the voltage appears across the load circuit as full-wave direct current.

When the magnet 23 is in the vertical position, as shown in Fig. 1, its flux is shunted through the keeper 21 and very little passes into the reactor core. Thus, the impedance of the reactor is very high and all of the applied voltage is absorbed by the reactor.

When the magnet 23 is actuated by the quick-acting mechanism 25 from the vertical position to a position parallel to the reactor the flux produced by the magnet passes through the pole pieces 16 and the reactor core. Only a small amount of flux will then be shunted by the keeper 21. As shown in Figs. 2 and 3 the flux $\theta_2$ produced by the magnet flows through the core 15. During any half cycle $\theta_2$ will oppose $\theta_1$, which is the flux produced by the coils 19, in one leg of the core and aid it in the other leg. Thus, the one leg of the reactor core is saturated; the other half of the core remains unsaturated. However, the winding on the unsaturated leg of the core does not present an appreciable impedance in the circuit because of the large effective air gap in the core produced by the saturated leg of the core. Therefore, most of the supply voltage appears across the load circuit.

It should be noted that the magnet 23 does not come into physical contact with the pole pieces 16 when it is actuated from its vertical position to its position between the pole pieces. Therefore, there is no hammering of the magnet which would cause excessive wear or breakage. Also, pounding of the magnet could cause a very objectionable decrease in its magnetism. Likewise, there is no physical contact between the keeper 21 and the permanent magnet 23.

Since the magnet is rotated very rapidly between positions by the quick-acting mechanism the output voltage of the switching system will be either "off" or "on". Accordingly, the present switch functions in a manner similar to a switch of the contact or blade type to control the voltage applied to a load circuit.

In the modification of the invention shown in Fig. 4 the coils 19 are disposed on a reactor core which is held in place between two pole pieces 16' by end portions 17. Each pole piece 16' has a groove 41 in one end of the pole piece. A magnetic keeper 21' has raised portions 42 which are disposed on a level with one side of the grooves 41 in the pole pieces 16'. A magnet 23', which is generally of a horseshoe shape, is carried by a disc 43 which is attached to a rotatable shaft 44. The disc 43 may be attached to the shaft 44 by a set screw 45 which extends through a collar 46 secured to the disc 43.

The magnet 23' is rotated by the shaft 44 which may be driven by any suitable mechanism. As the magnet 23' approaches the reactor and is in the position shown in Fig. 4, the flux of the magnet is shunted by the magnetic keeper 21' and does not pass through the core of the reactor. Thus, the reactor is unsaturated and the output voltage of the switching system is a minimum. When the magnet 23' is in line with the pole pieces 16' substantially all of its flux passes through the reactor core. Very little of the flux is shunted by the magnetic keeper. Accordingly, the output voltage is a maximum as explained hereinbefore.

As the shaft 44 continues to rotate the magnet 23' moves away from the reactor and the output voltage drops from its maximum value to its minimum value. The magnetic keeper 21' is utilized to increase the rate of change of the output voltage from "off" to "on" and vice versa.

In the present structure there is no physical contact between the magnet 23' and the pole pieces 16'. Therefore, there is no pounding of the magnet against the pole pieces or the keeper. Furthermore, the shaft 44 may be rotated in either direction during operation of the switching device. The electrical operation will be identical for either direction of operation.

It is obvious that there will be an output voltage for only a small part of each revolution of the shaft 44. Output voltages for any part of a revolution may be provided by using one reactor output to energize a magnetic element in a control system at the proper point of the revolution. Another reactor can then be placed at any desired point around the circumference of the disc 43 and utilized to deenergize the magnetic element or energize another magnetic element. When overlapping occurs, units can be placed one above the other along the shaft 44.

Figure 5:
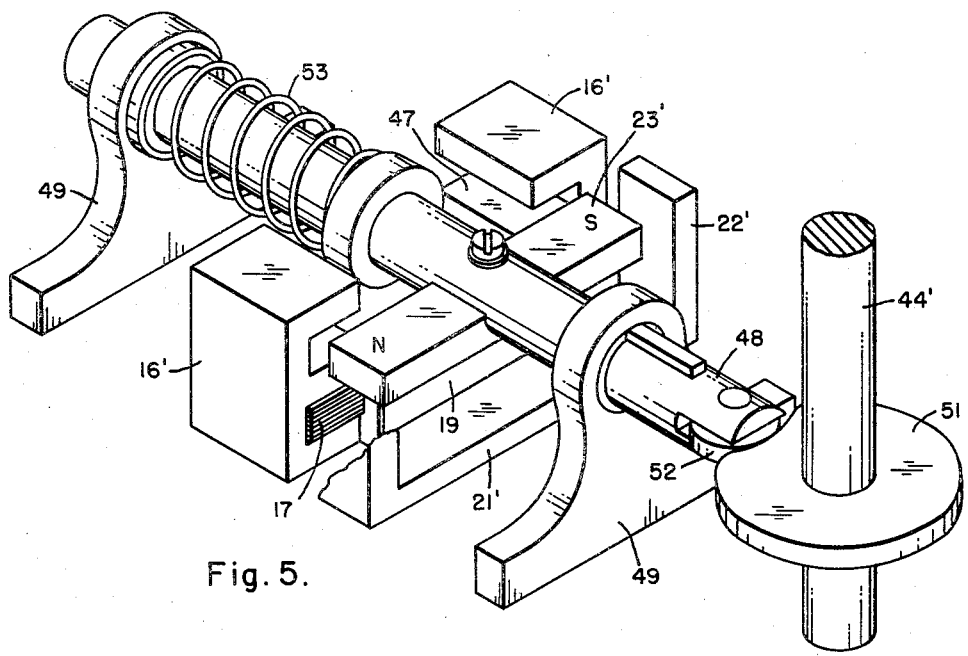
Fig. 5 is a view, in perspective, of another modification of the switching device.

In the structure shown in Fig. 5, the switching device is adapted for linear motion of the magnet 23'. The magnet is moved from a position between the end portions 22' of the keeper 21' to a position in grooves 47 in the pole pieces 16'.

The magnet 23' is carried by a reciprocating shaft 48 which is mounted in bearing supports 49. A cam 51, which is driven by a shaft 44', engages a roller 52 to actuate the shaft 48 in a direction to move the magnet 23' from its position between the end portions 22' of the keeper 21' to a position between the pole pieces 16'. A spring 53 returns the magnet 23' to its position between the end portions of the keeper 21' as the cam 51 is rotated to the position shown in Fig. 5 of the drawing. When the magnet 23' is in the keeper there will be no output from the electrical circuit. When the magnet is between the pole pieces the output will be a maximum. The shaft 44' may be driven in any desired manner and cams of different types may be utilized to secure an output voltage over any desired portion of a revolution.

From the foregoing description, it is apparent that we have provided a contactless switch which functions in a manner similar to a switch of the contact or blade type to control the voltage applied to a load circuit. The present switch may be utilized as a limit switch in a control system having magnetic logic elements to control the operation of a machine tool or other apparatus previously controlled by limit switches of the contact type. Since the present system does not contain contact members which are subject to deterioration by arcing and wear, the reliability and service life are greatly increased.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a switching system, in combination, a load circuit, an alternating current power circuit for energizing the load circuit, rectifying means interposed between the power circuit and the load circuit, a reactor having a core, a coil disposed on the core and connected in the power circuit, a magnet movable to a position to aid said coil in saturating said core, and a by-pass circuit for preventing the reactor exciting current from flowing through the load circuit.

2. In a switching system, in combination, a load circuit, a power circuit for energizing the load circuit, a reactor having a core, a coil disposed on the core and connected in the power circuit, a magnet movable from a position out of the magnetic circuit for the core to a position in said magnetic circuit to aid said coil in saturating the core and permitting current to flow to the load circuit through the reactor, and a quick-acting mechanism for actuating said magnet.

3. In a switching system, in combination, a load circuit, a power circuit for energizing the load circuit, a reactor having a core, a coil disposed on the core and connected in the power circuit, a magnet movable from a position at an angle to the reactor to a position parallel to the reactor to aid said coil in saturating the core and permitting current to flow to the load circuit through the reactor, and a quick-acting mechanism for actuating said magnet.

4. In a switching system, in combination, a load circuit, a power circuit for energizing the load circuit, a reactor having a core, a coil disposed on the core and connected in the power circuit, a magnet movable to a position to aid said coil in saturating said core, and a circuit permitting exciting current for the reactor to by-pass the load circuit.

5. In a switching system, in combination, a load circuit, a power circuit for energizing the load circuit, a reactor having a core, a coil disposed on the core and connected in the power circuit, a magnet movable to a position to aid said coil in saturating said core, and a resistor connected to provide a by-pass circuit for the reactor exciting current thereby preventing the exciting current from flowing through the load circuit.

6. In a switching system, in combination, a load circuit, a transformer having a secondary winding connected to energize the load circuit, the primary winding of the transformer having terminals for connecting to an alternating current power source, a reactor having a core, one or more coils disposed on the core and connected in series with the secondary winding of the transformer and the load circuit, a magnet movable to a position to aid in saturating said core thereby permitting current to flow to the load circuit through the reactor, and a quick-acting mechanism for actuating said magnet.

7. In combination, a load circuit, a power circuit for energizing the load circuit, a reactor having a two-legged core, a coil disposed on each leg of the core, said coils being connected in series-circuit relation in the power circuit, a magnet, a keeper composed of magnetic material and having spaced end portions, said magnet being movable from a position adjacent to the end portions of the keeper to a position adjacent to the core to aid said coils in saturating the core, and a by-pass circuit for preventing the reactor exciting current from flowing through the load circuit.

8. In combination, a load circuit, a power circuit for energizing the load circuit, a reactor having a two-legged core, a coil disposed on each leg of the core, said coils being connected in series-circuit relation in the power circuit, a magnet, a keeper composed of magnetic material and having spaced end portions, pole pieces at opposite ends of the core, said magnet being movable from a position adjacent to the end portions of the keeper to a position between said pole pieces to aid said coils in saturating the core, and a by-pass circuit for preventing the reactor exciting current from flowing through the load circuit.

9. In a contactless switching device, in combination, a core composed of magnetic material, a coil disposed on said core, pole pieces at opposite ends of said core providing a magnetic circuit for flux produced by the coil, a magnet, a keeper composed of magnetic material and having spaced end portions, and a mechanism for moving said magnet from a position adjacent to the end portions of the keeper to a position between said pole pieces without engaging the pole pieces where the flux produced by the magnet aids in saturating the core.

10. In a contactless switching device, in combination, a core composed of magnetic material, a coil disposed on said core, pole pieces at opposite ends of said core providing a magnetic circuit for flux produced by the coil, a magnet, a keeper composed of magnetic material and having spaced end portions, and a mechanism for moving said magnet from a position where the flux produced by the magnet flows through said keeper to a position where the flux of the magnet flows through the pole pieces to aid in saturating the core, said magnet being actuated without engaging the keeper or the pole pieces.

11. In a contactless switching device, in combination, a core composed of magnetic material, a coil disposed on said core, pole pieces at opposite ends of said core providing a magnetic circuit for flux produced by the coil, a magnet, a keeper composed of magnetic material and having spaced end portions, and a quick-acting mechanism for rotating said magnet from a position between the end portions of the keeper to a position between said pole pieces thereby causing the flux produced by the magnet to aid in saturating the core.

12. In a contactless switching device, in combination, a core composed of magnetic material, a coil disposed on said core, pole pieces at opposite ends of said core providing a magnetic circuit for flux produced by the coil, a magnet, a keeper composed of magnetic material and having spaced end portions, and a quick-acting mechanism for rotating said magnet from a position at an angle to said core and between the end portions of the keeper to a position parallel to the core and between said pole pieces thereby causing the flux produced by the magnet to aid in saturating the core.

13. In a contactless switching device, in combination, a coil disposed on said core, pole pieces at opposite ends of said core providing a magnetic circuit for flux produced by the coil, a magnet, a keeper composed of magnetic material and having spaced end portions, and a mechanism for moving said magnet from a position adjacent to the end portions of the keeper to a position between faces of the pole pieces disposed on opposite sides of the magnet and parallel to the plane of movement of the magnet thereby causing the flux produced by the magnet to aid in saturating the core.

14. In a contactless switching device, in combination, a supporting frame, a mounting plate rotatably mounted in said frame, securing means for fastening said plate in any desired angular position, spaced magnetic pole pieces attached to said plate, a magnetic core secured between said pole pieces, a coil disposed on the core, a magnetic keeper having spaced end portions bent at right angles to the body of the keeper, said keeper being disposed at an angle to the core, and a quick-acting mechanism for rotating said magnet from a position between the end portions of said keeper to a position between said pole pieces thereby causing the flux produced by the magnet to aid in saturating the core.

15. In a contactless switching device, in combination, a core composed of magnetic material, a coil disposed on said core, pole pieces at opposite ends of said core, each pole piece having a groove in one end thereof, a magnetic keeper having raised portions disposed substantially on a level with one side of said grooves, a rotatable shaft, a magnet carried by the shaft, said magnet passing over the raised portions of the keeper and through the grooves in the pole pieces as it is rotated by the shaft in a plane parallel to portions of the keeper and faces in the grooves of the pole pieces.

16. In a contactless switching device, in combination, a core composed of magnetic material, a coil disposed on said core, pole pieces at opposite ends of said core, each pole piece having a groove in one end thereof, a magnetic keeper having raised portions disposed on a level with one side of said grooves, a rotatable shaft, a generally horseshoe-shaped magnet carried by the shaft, the ends of said magnet passing over the raised portions of the keeper and through the grooves in the pole pieces as it is rotated by the shaft.

17. In a contactless switching device, in combination, a core composed of magnetic material, a coil disposed on the core, pole pieces at opposite ends of the core, a magnetic keeper having spaced angularly disposed end portions, a reciprocating member, and a magnet carried by said member, said magnet being moved by said member from a position between the spaced ends of the keeper to a position between said pole pieces to aid the coil in saturating the core.

18. In a contactless switching device, in combination, a core composed of magnetic material, a coil disposed on the core, pole pieces at opposite ends of the core, a magnetic keeper having spaced angularly disposed end portions, a reciprocating member, a magnet carried by said member, a rotatable shaft, and a cam carried by the shaft for actuating said reciprocating member, said magnet being moved by said member from a position between the spaced ends of the keeper to a position between said pole pieces to aid the coil in saturating the core.

References Cited in the file of this patent

UNITED STATES PATENTS

| | | |
|---|---|---|
| 838,949 | Churchward | Dec. 18, 1906 |
| 866,011 | Ferguson | Sept. 17, 1907 |
| 2,341,446 | Klinkhamer et al. | Feb. 8, 1944 |
| 2,696,583 | Brown | Dec. 7, 1954 |
| 2,736,869 | Rex | Feb. 28, 1956 |